UNITED STATES PATENT OFFICE.

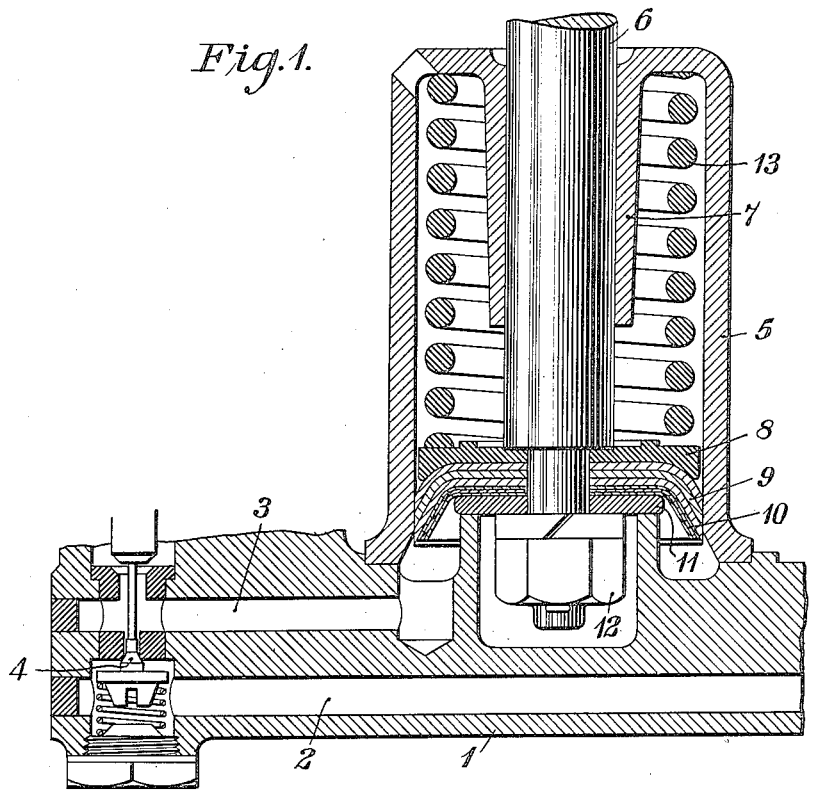
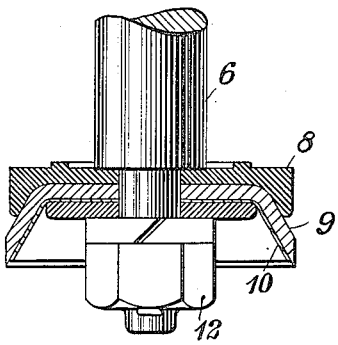
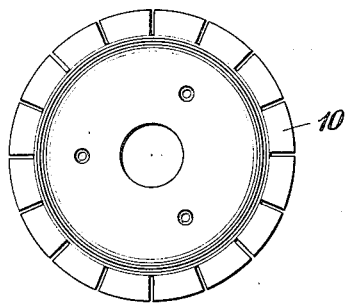

HENRY R. EDGECOMB, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

PISTON-PACKING.

1,075,468.      Specification of Letters Patent.      Patented Oct. 14, 1913.

Application filed February 3, 1910. Serial No. 541,714.

*To all whom it may concern:*

Be it known that I, HENRY R. EDGECOMB, a citizen of the United States, and a resident of Edgewood Park, in the county of Allegheny and State of Pennsylvania, have invented a new and useful Improvement in Piston-Packings, of which the following is a specification.

My invention relates to packings for the pistons of fluid-pressure actuated devices, and it has for its object to provide a piston packing that shall be substantially impervious to air or other fluid pressure and that shall be so constructed as to be durable and effective.

Figure 1 of the accompanying drawings illustrates a part of a fluid-pressure actuated device that embodies my invention. Fig. 2 illustrates a modified form of the piston of Fig. 1, and Fig. 3 illustrates a reinforcing washer for the packings of Figs. 1 and 2.

The device in connection with which my invention is illustrated, comprises a base member 1 having passages 2 and 3, communication between which is governed by means of a valve 4 that may be actuated either manually or by other means (not shown). Secured to the base member 1, over the outlet of the passage 3, is a cylinder 5 in which operates a piston, the stem 6 of which is guided in its movements by means of an internal sleeve 7 that is formed integral with the cylinder 5. The stem 6 may be connected, at its outer end, to any suitable device which it may be desired to operate thereby. The head of the piston comprises a plate 8 having a dished or concave lower face, a plurality of dished washers or packing rings 9, a compound reinforcing washer 10 for the packing rings 9, and a plate 11 between which and the plate 8 the parts 9 and 10 are clamped by means of a nut 12 that is screwed upon the lower end of the stem 6. The piston is maintained in its lowermost position by means of a helical compression spring 13 that is interposed between the upper end of the cylinder 5 and the plate 8.

The packing rings 9 are composed of leather or other suitable tough and fibrous material, the outer annular portions of which are inclined to the central portions at an angle of approximately 60°, instead of being substantially at right angles thereto, as has heretofore been the usual form. The edges of the packing rings are also trimmed on a bevel with respect to the faces thereof so as to form a cylindrical surface for engagement with the internal face of the cylinder 5, a fibrous surface being thereby presented for contact with the cylinder wall. In Fig. 1, the piston is shown as provided with three of the packing rings, though one may be employed, if desired, as shown in Fig. 2, or any other suitable number may be employed. The packing rings are preferably treated according to a process that forms the subject matter of another application, Serial No. 541,723 filed of even date herewith by John L. Crouse and myself, and assigned to the Westinghouse Electric & Manufacturing Company.

The compound reinforcing washer 10 is preferably composed of a plurality of dished and nested pieces of resilient metal that are provided, at intervals, with radial slits to provide resilient fingers that engage the downwardly inclined portions of the packing rings 9 and are so curved as to insure the application of pressure thereby to the packing rings, adjacent to their outer edges. As the fluid pressure is applied to the concave side of the washer 10, it assists in forcing the packing rings against the cylinder walls. The reinforcing washer is also of slightly less diameter than the packing rings 9 so that the fluid pressure may act upon the edges of the lowermost packing ring and force them against the walls of the cylinder.

The packing above described is much more effective in service than any packings that have heretofore been provided, for the reason that the leather washers are not bent abruptly at any point, and, accordingly, the fibers of the leather are not broken or weakened, nor is the leather rendered porous by the bending thereof. A plurality of leather washers are also preferably employed instead of one, and, as the beveled fibrous edges thereof engage the walls of the cylinder, a tighter joint is made than results when either of the faces of the leather is presented for engagement with the walls of the cylinder.

I claim as my invention:

1. A piston head comprising one or more dished pliable washers, the outer annular portions of which are inclined to the central portions thereof, and the edges of which are beveled, and one or more dished resilient reinforcing washers nested within and of slightly less diameter than the pliable washers.

2. A piston head comprising one or more dished pliable washers, the outer annular portions of which are inclined to the central portions thereof and the edges of which are beveled, and one or more resilient dished reinforcing washers nested within the pliable washers.

3. A piston head comprising one or more dished pliable washers, the outer annular portions of which are inclined to the central portions thereof and the edges of which are beveled, one or more resilient dished reinforcing washers nested within the pliable washers, and plates between which the said washers are clamped.

In testimony whereof, I have hereunto subscribed my name this 31st day of Jan., 1910.

HENRY R. EDGECOMB.

Witnesses:
T. D. LYNCH,
B. B. HINES.